(No Model.) 2 Sheets—Sheet 1.
W. C. JENNINGS.
RENEWABLE SEAT VALVE.
No. 564,378. Patented July 21, 1896.
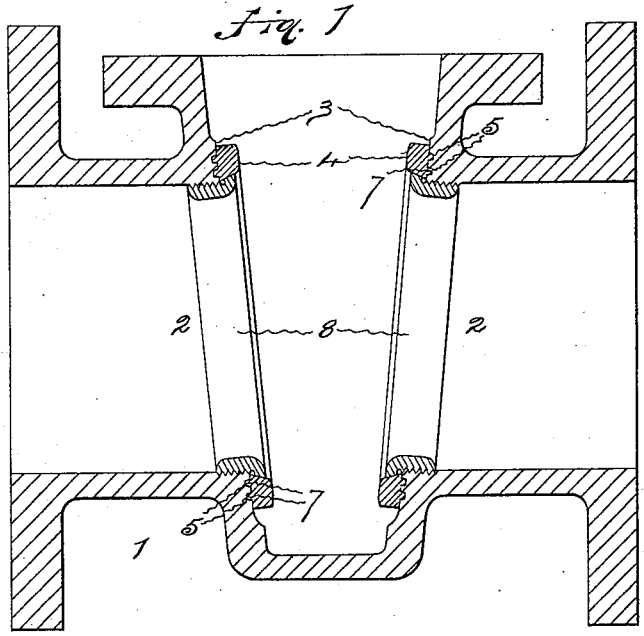
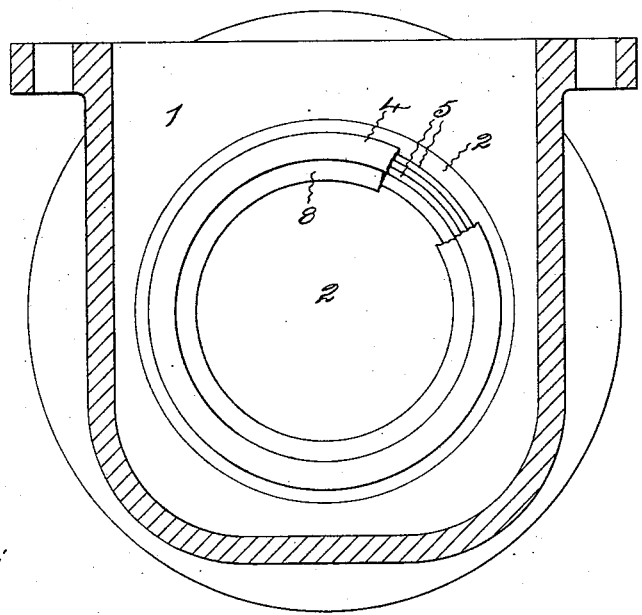
Witnesses:
C. E. Buckland
E. B. Hatch
Inventor:
William C. Jennings,
by,
Harry R. Williams
atty.
THE NORRIS PETERS CO., PHOTO-LITHO., WASHINGTON, D. C.

(No Model.) 2 Sheets—Sheet 2.

W. C. JENNINGS.
RENEWABLE SEAT VALVE.

No. 564,378. Patented July 21, 1896.

Witnesses:
C. E. Buckland
E. B. Hatch

Inventor:
William C. Jennings
Harry R. Williams
atty.

UNITED STATES PATENT OFFICE.

WILLIAM C. JENNINGS, OF CAMDEN, NEW JERSEY, ASSIGNOR TO THE PRATT & CADY COMPANY, OF HARTFORD, CONNECTICUT.

RENEWABLE SEAT-VALVE.

SPECIFICATION forming part of Letters Patent No. 564,378, dated July 21, 1896.

Application filed March 26, 1894. Serial No. 505,142. (No model.)

*To all whom it may concern:*

Be it known that I, WILLIAM C. JENNINGS, a citizen of the United States, residing at Camden, in the county of Camden and State of New Jersey, have invented certain new and useful Improvements in Renewable Seat-Valves, of which the following is a specification.

The invention relates to a class of renewable seat-valves; and the object is to so construct such valves that small and simple seats of any suitable material can be easily placed in or quickly removed from position in order that new seats can at any time be provided for those that become worn, said seats being held in position by simple means in such manner that they make tight joints between the body of the valve and the gate without any special or careful fitting of the retaining parts, which retaining parts are so arranged and located as to protect and strengthen the seats, thereby insuring efficiency and durability.

Figure 3:
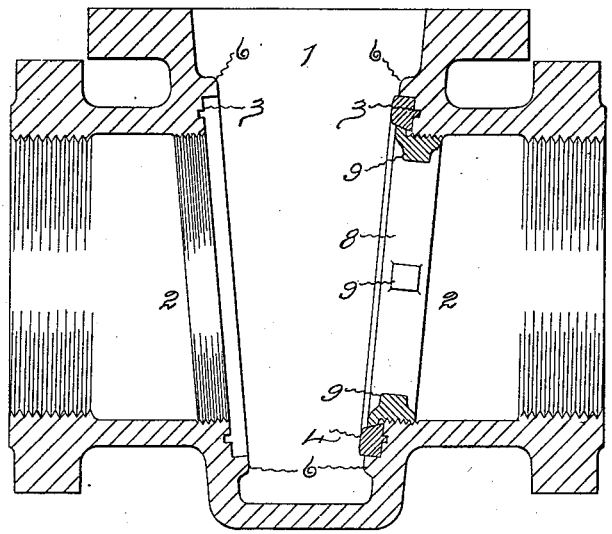
Figure 4:
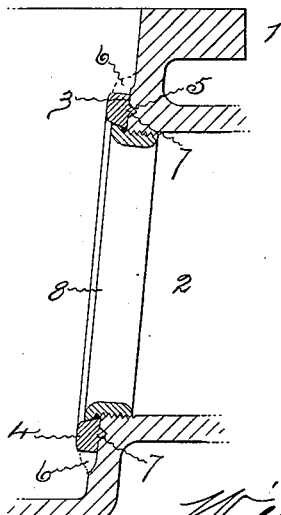

Referring to the accompanying drawings, Figure 1 is a longitudinal section of the body of a gate-valve embodying the invention. Fig. 2 is a transverse section of the same. Fig. 3 is a longitudinal section of a modification of the same; and Fig. 4 is a detailed view of a portion of the seat and retaining-ring, illustrating another modification.

In the views, 1 indicates the body of a gate-valve that is cast to shape of the usual metal with threaded or flanged ends of common form for attachment to the pipes of the system in which the valve is to be placed, and a top adapted to receive any ordinary cap or bonnet. Around the ports 2 and preferably inclining from each other so as to be parallel with the sides of the tapering gate, are formed faces 3, for backing up the seats 4. These faces are usually machined, and may be either plain or may have one or more grooves 5 cut in them around the ports, as shown in Figs. 1 and 4, or if desired the machined seat-faces may be so cut as to leave a metallic rim 6 around the outside that encircles, protects, and aids in holding the outer periphery of the seats when in position, as shown in Fig. 3.

The seats 4 may be formed of composition, brass, or any other suitable metal, or they may be formed of asbestos and rubber composition or similar packing materials that will suitably withstand the high pressures and fulfil the varying conditions to which they are subjected in valves of this class. These seats are made in the form of rings or washers of a size and shape that will lie closely against the machined surfaces around the two ports. The back faces of these seats if desired may have one or more annular ribs or tongues 7, according to the number of grooves formed in the body of the valve in which the tongues will fit, and the front faces are usually curved, as that shape easily makes a tight and durable joint with the surface of the gate, while the inner peripheries of these seat-rings are made on a bevel so as to provide wedge surfaces for engagement with the tapering edges of the retaining-rings 8. It is preferred to make the grooves a little tapering and also the tongues a little tapering, so that when the tongues and grooves are fitted together tight joints will be made, which prevent any possibility of the passage of fluid between the back faces of the seats and the body of the valve, and this form also so holds the parts together that the seats will be retained in position by the tight-fitting tongues and grooves. The outer peripheries of these seat-rings are usually made square so as to fit the outer annular rims 6, formed on the body of the valve either in casting or when the seat-faces are cut, so that these rims will surround the outer edges of the seats and protect and reinforce them so as to bear the strain incident to the friction of the gate on the seats in opening or closing the valve.

The retaining-rings 8, which may be of brass or any other desirable metal in the form of light rings, are provided with screw-threads that fit threads cut in the body of the valve around the ports, and the exteriors of one of the edges of the holders are formed on an angle or otherwise suitably shaped for an engagement with the beveled inner peripheries of the seats.

The seats are first laid in position against the surfaces prepared for them around the ports on each side of the gate-chamber, and then the retaining-rings are screwed into the threaded ports until the inclined edges of these retaining-rings engage the beveled inner peripheries of the seats and wedge against them so as to draw the seats to the valve body and aid in retaining them in position.

The retaining-rings are provided with lugs 9, or any other means for the engagement of the tool used for turning the retaining-rings when they are to be screwed into or out of engagement with the seats. These retaining-rings when screwed up not only aid in holding the seats in place but protect the inner peripheries of the seats from being worn and cut away by the action of the fluid as it rushes through the valve when the gate is open or is being opened or closed. The retaining-rings also wedge outward against the inner peripheries of the seats in such manner that the seats cannot be crushed or flattened toward the central opening by the movement of a gate when opening or closing, and if the outer protecting-rims are left around the seat-faces the seat-rings are so reinforced that they will not be pulled apart by any frictional strain of a gate on the seats. These outer rims also take the strain in such manner as to relieve the thinner and lighter retaining-rings that are screwed into the ports and protect the inner peripheries of the seats. No special fitting is required for the retaining-rings when made in this manner, for as the seats have beveled inner peripheries that are engaged by the beveled edges of the retaining-rings, these edges wedge together and adjust themselves so that no absolute stop is required for locating the retaining-rings in the exact position to tightly hold the seats. The wedging-faces of the sides of the gate force the seats toward the walls of the body in the same direction that the wedging-faces of the retaining-rings draw the seats, so that the seats can be forced tightly against the walls of the body, and if the tongues and grooves are provided the seats are so forced by the wedge that these tongues and grooves are jammed together, which besides making tight joints serve to hold the seats in position and prevent them from getting out of place.

When a valve is constructed as above described, the seats, which are simple rings that are cheap and occupy but little space, can be easily and quickly removed when they become worn and a new seat substituted and held tightly in place. The retaining-rings are simple and can be screwed into or out of place by means of any simple tool, so as to aid in retaining the seats, or freeing them so that they may be easily removed. The seats can be very quickly renewed when they become worn. They are interchangeable and they may be made of various materials, according to the use to which the valve is to be put. Different seats of various materials can be provided for the same valve if desired. As the seats pack the joints between the gate and the body it is not necessary that the retaining-rings and their threads be turned to any exact location to make a tight joint, for the wedging of the parts together when the gate is closed make such joints that fluid cannot pass either in front or back of the seats.

I claim as my invention—

1. In combination in a valve having ports with annular grooves having tapering walls around the ports, seat-rings having beveled inner peripheries and annular tongues on the back faces projecting into the annular grooves encircling the ports, and threaded retaining-rings turning in threads around the ports, said retaining-rings having inclined peripheral portions engaging with the beveled inner peripheries of the seat-rings for retaining them in place, substantially as specified.

2. In combination in a valve having ports with annular seat-faces containing annular grooves around the ports and protecting-rims around the seat-faces, seat-rings having beveled inner peripheries and annular tongues on their back faces projecting into the annular grooves encircling the ports, with their outer edges encircled by the protecting-rims, and threaded retaining-rings turning in threads around the ports, said retaining-rings having inclined peripheral portions engaging with the beveled inner peripheries of the seat-rings for retaining them in place, substantially as specified.

WILLIAM C. JENNINGS.

Witnesses:
HOMER H. STUART,
HENRY GARRETSON.